US006854582B1

(12) United States Patent
Pryor

(10) Patent No.: US 6,854,582 B1
(45) Date of Patent: Feb. 15, 2005

(54) STACK STOP FOR CONVEYOR SYSTEM

(75) Inventor: Glen F. Pryor, Mokena, IL (US)

(73) Assignee: Formax, Inc., Mokena, IL (US)

( * ) Notice: Subject to any disclaimer, the term of this patent is extended or adjusted under 35 U.S.C. 154(b) by 0 days.

(21) Appl. No.: 10/666,533

(22) Filed: Sep. 20, 2003

(51) Int. Cl.⁷ .............................................. B65G 37/00
(52) U.S. Cl. .................................. 198/346.2; 414/788
(58) Field of Search ....................... 198/346.2; 414/788, 414/907

(56) References Cited

U.S. PATENT DOCUMENTS

| | | | | |
|---|---|---|---|---|
| 2,792,921 A | * | 5/1957 | Sharpe ..................... | 198/346.2 |
| 4,509,891 A | * | 4/1985 | Lipscomb ................. | 414/795.7 |
| 4,558,984 A | * | 12/1985 | Garrett ...................... | 414/609 |
| 4,583,634 A | * | 4/1986 | Kraus et al. ............ | 198/341.01 |
| 4,600,095 A | * | 7/1986 | Brems et al. ............. | 198/346.2 |
| 4,700,824 A | * | 10/1987 | Vere et al. ............... | 198/346.2 |
| 5,387,077 A | * | 2/1995 | Yatsuka et al. ............ | 414/791 |
| 5,450,940 A | * | 9/1995 | Rathert et al. ............. | 198/412 |
| 6,155,775 A | * | 12/2000 | Depinet et al. .......... | 414/796.4 |

\* cited by examiner

Primary Examiner—Douglas Hess
(74) Attorney, Agent, or Firm—The Law Office of Randall T. Erickson, P.C.

(57) ABSTRACT

An improved stopping mechanism is provided for a conveyor that accepts one or more streams of product input and converts the one or more streams to a format that is suitable for automatic loading to a subsequent machine, wherein a stack of slices must be temporarily stopped on the conveyor while moving. The stopping mechanism includes a lower stop having a lower stack-engaging portion and a lift portion, the lift portion selectively actuatable to elevate the lower stack-engaging portion to engage a bottom surface of the stack and to lift the stack above the conveying surface. The stopping mechanism further includes an upper stop having an upper stack-engaging portion and a lowering portion, the lowering portion selectively actuatable to lower the upper stack-engaging portion to engage an upper surface of the stack.

18 Claims, 3 Drawing Sheets

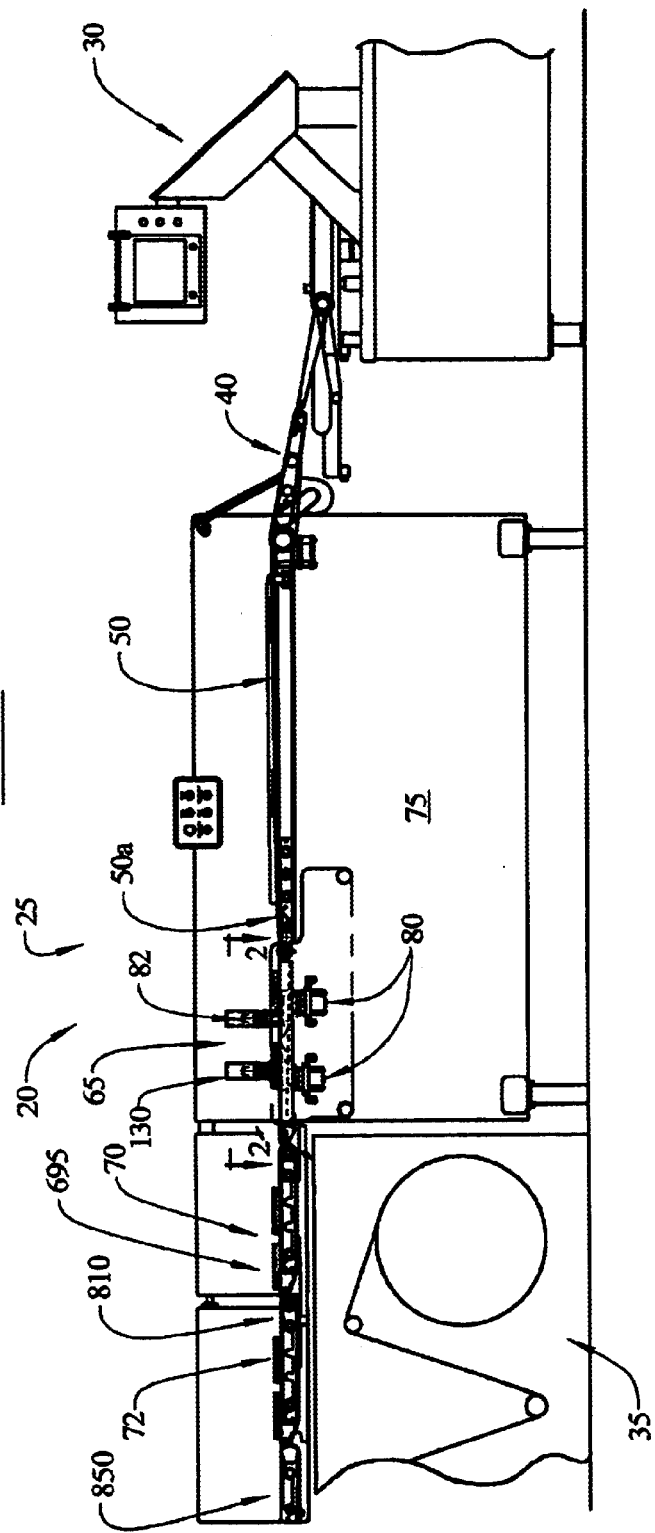

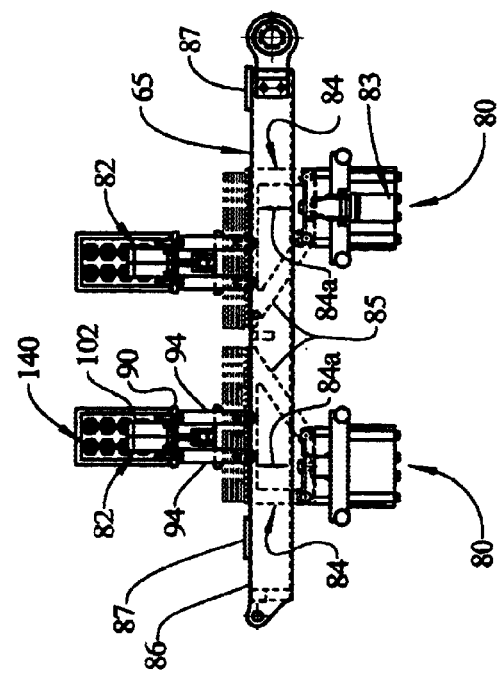
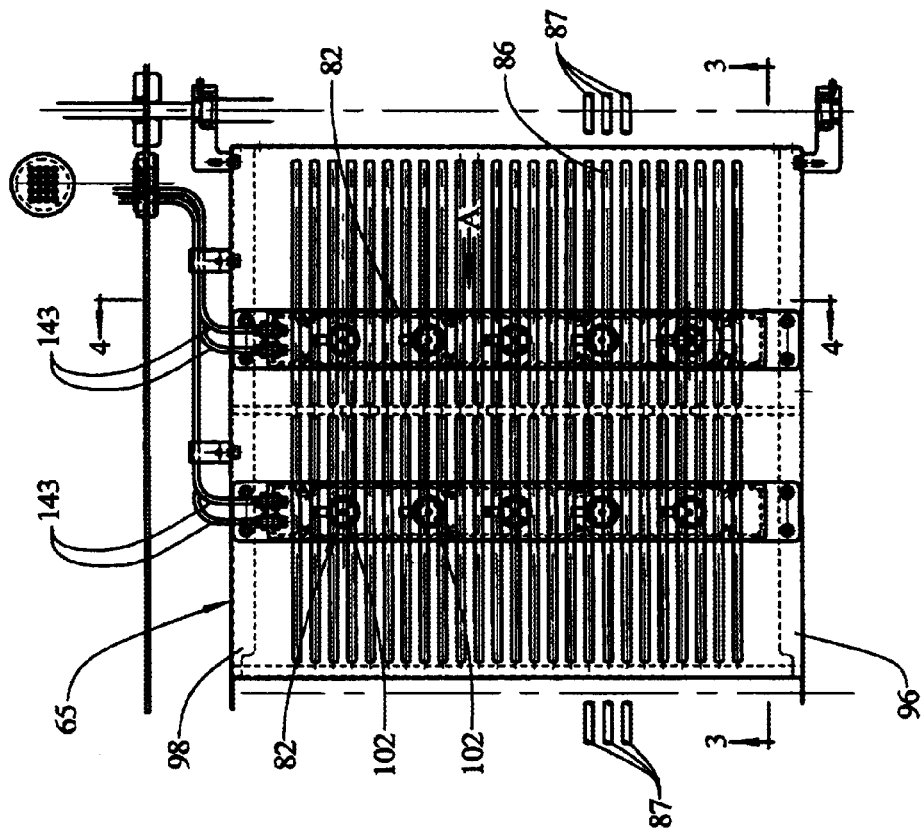

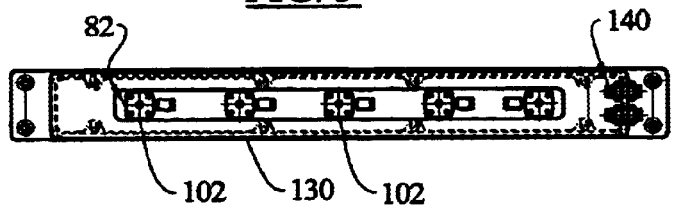
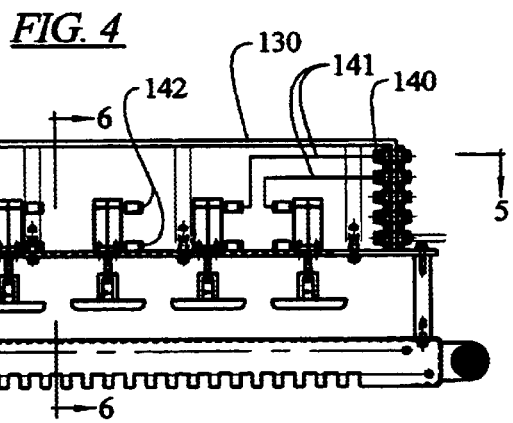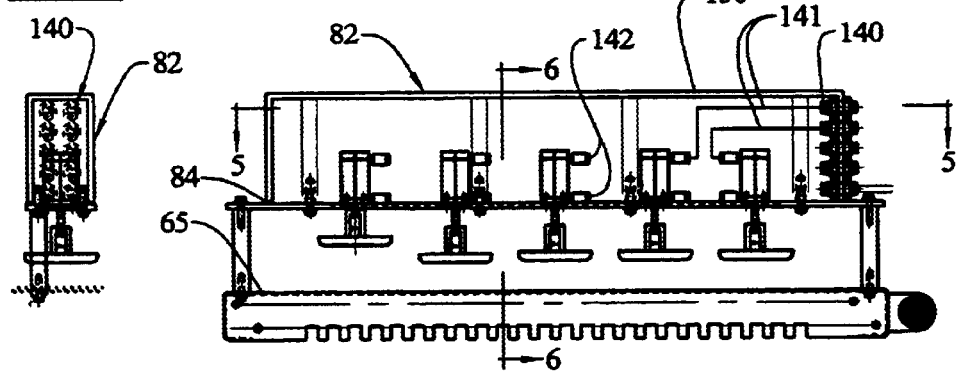
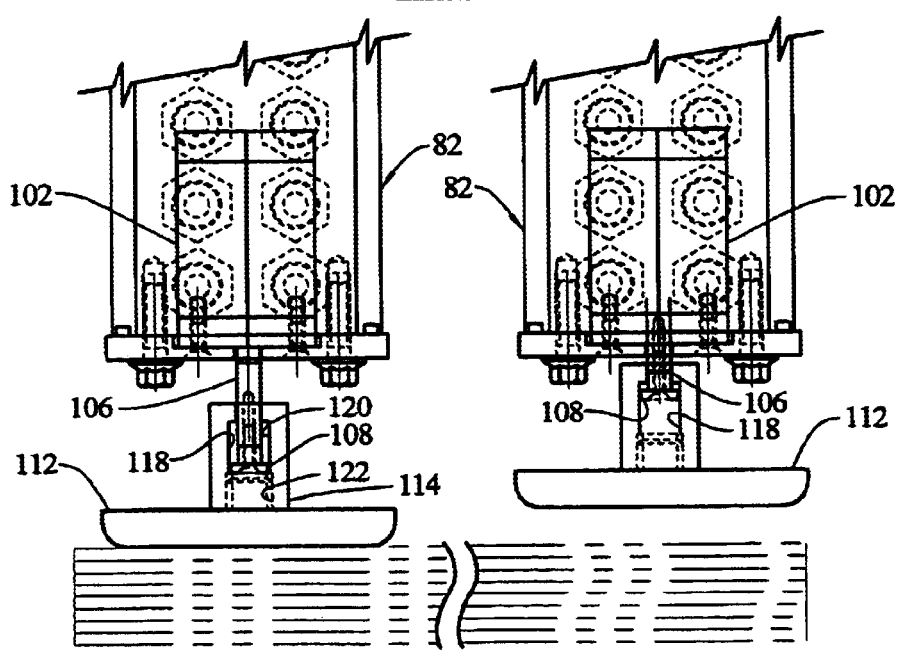

STACK STOP FOR CONVEYOR SYSTEM

TECHNICAL FIELD OF THE INVENTION

The present invention relates to a conveyor system. More particularly, the present invention relates to a conveyor system for use in accepting one or more product streams and formatting the product to match the format required at the input of a packaging machine.

BACKGROUND OF THE INVENTION

Conveyor systems are used for a wide range of purposes. One such purpose is the formatting of one or more streams of product so that, for example, the product spacing corresponds to the spacing needed for a subsequent operation. Such conveyor systems are used, for example, to convert one or two output streams of stacked or shingled meat from a slicing machine into the format required by a packaging machine. Depending on the required format, the conveyor must combine two or more separate streams into a single output stream or multiply the streams into a larger number of output streams. Additionally, the conveyor must properly space the product along both the length and the width of the conveyor to ensure compatibility with the packaging machine.

Conventional conveyor systems for changing the number of streams of product usually include a simple flat belt conveyor and a series of fixed curbs or belt conveyors which guide the products in the lateral direction of the belt conveyor to merge two streams into one or to multiply the number of streams. Examples of these conventional conveying systems are described in FR-A-2587007, FR-A2168967, and U.S. Pat. No. 5,810,149.

U.S. Pat. No. 5,810,149 discloses a conveyor system for accepting one or more streams of product input and converting the one or more streams to a format that is suitable for automatic loading to a subsequent machine. To perform the format conversion some stacks must be temporarily stopped on a moving format conveyor to align lateral rows. The stopping is accomplished by bottom "pop up" stop grids that raise moving stacks from the conveying surface. The A•180® AUTOLOADER™, available from Formax, Inc., of Mokena, Ill., U.S.A. incorporates such stop grids.

While the system described in U.S. Pat. No. 5,810,149 and the A•180® AUTOLOADER™ have achieved success in the formatting of shingled stacks and straight stacks, the present inventors have recognized that frozen, near frozen or otherwise slippery slices of meat or cheese arranged in stacks tend to become disrupted when stopped from force on the bottom slice only by the bottom stop grids.

A typical A•180® AUTOLOADER™ employs the "pop up" stop grids that stop products received from the upstream slicer, in defined rows. The A•180® AUTOLOADER™ can have two or three rows to match packaging machine die formats. The products are typically traveling along the conveyor from 100 to 130 feet per minute when abruptly stopped by the pop up stop grids, triggered by photo eye sensors. Straight stacks of slippery slices tend to at least partially overturn or shuffle due to the inertia of the moving stack and the low coefficient of friction between slices. FIG. 8 illustrates this phenomenon. Stacks that are out of proper alignment can be more difficult to package and can lose an orderly packaged appearance.

The present inventors have recognized the desirability of providing a stack stopping device for a formatting conveyor wherein stacks can be stopped on the conveyor without disturbing stack alignment.

The present inventors have recognized the desirability of providing a product stopping device for a conveyor wherein a quick and complete stop of the product can be ensured.

BRIEF SUMMARY OF THE INVENTION

An improved stack stopping mechanism is disclosed for a conveyor system that accepts one or more streams of product input and converts the one or more streams to a format that is suitable for automatic loading to a subsequent machine, the converting involving a step wherein stacks of slices must be temporarily stopped on a moving conveyor.

The stopping mechanism according to the invention includes a lower stop having a lower stack-engaging portion and a lift portion, the lift portion selectively actuatable to elevate the lower stack-engaging portion to engage a bottom surface of the stack and to lift the stack above the conveying surface, and an upper stop having an upper stack-engaging portion and a lowering portion, the lowering portion selectively actuatable to lower the upper stack-engaging portion to engage an upper surface of the stack substantially simultaneously with the lifting of the stack. The stack is thereby pressed between the lower stack-engaging portion and the upper stack-engaging portion to prevent shuffling or tipping of the stack during stopping of the stack.

The stopping mechanism can include a lost-motion connection between the lowering portion and the upper stack-engaging portion to accommodate stacks of varying heights.

The upper stack-engaging portion can engage the stack by force of the weight of the upper-engaging portion.

The lift portion and the lowering portion can be configured to act simultaneously.

The lift portion and the lowering portion can each comprise a pneumatic cylinder, the pneumatic cylinders being dual acting to both lift and lower the upper stack-engaging portion and the lower stack-engaging portion to engage and then release the stack.

The upper stack-engaging portion can comprise a disk having a flat bottom surface.

The lowering portion can comprise a pneumatic cylinder having an extending rod, and the lost-motion connection can comprise an end cap fixed to the rod and a connection portion fixed to the upper stack-engaging portion. The connection portion can have a space allowing limited free vertical movement of the end cap.

The invention provides a conveyor system for laterally aligning stacks of food products, comprising: a conveying surface receiving a stream of stacks sequentially in laterally spaced positions, the conveying surface conveying the stacks in longitudinal lanes; two lower stops arranged laterally side-by-side beneath two adjacent longitudinal lanes, and each having a lower stack-engaging portion a lift portion, the lift portion selectively actuatable to elevate the lower stack-engaging portion to engage a bottom surface of the stack and to lift the stack above the conveying surface; and two upper stops arranged respectively above the two lower stops, and each having an upper stack-engaging portion and a lowering portion, the lowering portion selectively actuatable to lower the upper stack-engaging portion to engage an upper surface of the stack, substantially simultaneously with the lifting of the stack; wherein when two side-by-side stacks are stopped by the two upper stops and the two lower stops, the two upper stops and the two lower stops are reversed to release the stacks to transfer the stacks together longitudinally along the conveying surface.

The present invention provides a product stopping device, the product being a single product, a shingled stack, or a straight stack, for a conveyor wherein a quick and complete stop of the product is ensured.

Numerous other advantages and features of the present invention will be become readily apparent from the following detailed description of the invention and the embodiments thereof, and from the accompanying drawings.

BRIEF DESCRIPTION OF THE DRAWINGS

FIG. 1 is a diagrammatic elevational view of a slicing and packaging system that incorporates the present invention;

FIG. 2 is an enlarged, fragmentary plan view of a portion of the system shown in FIG. 1;

FIG. 3 is a sectional view taken generally along line 3—3 of FIG. 2;

FIG. 4 is a sectional view taken generally along line 4—4 of FIG. 2;

FIG. 5 is a sectional view taken generally along line 5—5 of FIG. 4;

FIG. 6 is a sectional view taken generally along line 6—6 of FIG. 5;

FIG. 7 is an enlarged, fragmentary sectional view taken from FIG. 3; and

FIG. 8 is an enlarged, fragmentary sectional view of a prior art stop arrangement.

DETAILED DESCRIPTION OF THE INVENTION

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a slicing/conveying/packaging system, shown generally at 20 which utilizes a conveyor system, shown generally at 25, constructed in accordance with one embodiment of the present invention. As shown, the system 20 comprises a slicing machine 30, the conveyor system 25, and a packaging machine 35. The system can be as described in U.S. Pat. No. 5,810,149, herein incorporated by reference. For simplicity of description, the system described does not include multilevel conveyors such as described in U.S. Pat. No. 5,810,149.

The slicing machine 30 may be, for example, a high-speed slicing machine such as an S-180™ or FX180™ available from Formax, Inc., of Mokena, Ill., U.S.A. The packaging machine 35 may be, for example, a TIROMAT 3000 available from Tiromat or MULTIVAC R530, available from Multivac, Inc. of Kansas City, Mo., U.S.A. Although the preferred embodiment is described herein in a system including the packaging machine 35 and the slicing machine 30, it will be recognized that the conveyor system 25 can be used in connection with other types of product supplies and product outputs.

The conveyor system 25 accepts one or more streams of product from the slicing machine 30 and arranges the products in the proper format for acceptance by the packaging machine 35. Different packages require different product formats at the packaging machine input.

To achieve the proper product format, the conveyor system 25 utilizes a plurality of unique conveyor sections that cooperate with one another to provide a wide range of different product formats with the same basic conveyor system construction. In the illustrated embodiment of the conveyor system 25, the unique conveyor sections comprise an input conveyor 40, a strip conveyor 50, a row staging conveyor 65, and output conveyors 70, 72. The conveyors are driven by a plurality of motors and actuators under the control of, for example, a programmable logic controller (PLC) or microcontroller based system. The motors, actuators, and control electronics are preferably disposed within a main housing 75. More preferably, the main housing 75 is separated into upper and lower regions by a dividing wall which separates and protects the control electronics from the motors, etc.

In operation, the input conveyor 40 receives one or more streams of stacked sliced meat from the slicing machine 30 and transfers the one or more streams to the strip conveyor 50. The strip conveyor 50 is disposed to receive the one or more product streams, in this embodiment, from the input conveyor 40 and is operable to selectively shift its far end 50a laterally to deliver the one or more product input streams to positions spaced-apart across the width of the row staging conveyor 65. The mechanisms for laterally shifting the conveyor end 50a are explained in detail in U.S. Pat. No. 5,810,149 regarding either of the upper and lower shift conveyors (numbered 50, 55 in U.S. Pat. No. 5,810,149).

The row staging conveyor 65 illustrated in the present embodiment comprises at least one set of lower stop members 80 that engage a bottom face of the product stacks received from the conveyor 50 and at least one set of upper stop members 82 that engage a top face of the product stacks received from the conveyor 50, to align the product stacks in one or more rows. In the illustrated embodiment, the row staging conveyor 65 includes two rows of stop members 80, 82 each row being aligned laterally across at least a portion of the width of the row staging conveyor 65.

FIG. 3 sets forth one embodiment of the lower stop member 80. Each stop member 80 is comprised of an actuator section 83 which is connected to drive a stop grid section 84 in the vertical direction designated by arrows 84a. The actuator section 83 preferably comprises a linear pneumatic actuator. The stop grid sections 84 comprise a plurality of longitudinally extending blades 85 that extend through an upper support surface 86 of the conveyor and are aligned with the interstitial regions between conveyor bands 87, a few of which are shown in fragmentary fashion in FIGS. 2 and 3. The actuator section 83 of each stop member 80 is operable to drive the blades 85 of the stop grid section 84 between a first position in which the top of the blades 85 are disposed at or below the top surface of the conveyor bands 87 and a second position in which the top of the blades 85 extend above the top surface of the conveyor bands 87.

The stop members 80 and the installation and configuration as a module are as available commercially in the A 180® AUTOLOADER™, available from Formax, Inc., of Mokena, Ill., U.S.A. and are described in more detail in U.S. Pat. No. 5,810,149, herein incorporated by reference.

The strip conveyor 50 directs first and second product stacks to their respective lateral positions on the row staging conveyor 65. When the conveyor system 25 detects that the first product is present at a first stop 80, 82 the stop members 80, 82 corresponding to the lateral position of the first product stack are actuated to simultaneously lift the product from the conveyor bands 87 and press the top of the product stack. Similarly, when the conveyor system 25 detects that a second product stack is present at a laterally adjacent stop 80, 82 located in an adjacent longitudinal column, the stop members 80, 82 corresponding to the lateral position of the second product stack is actuated to lift the product stack from the conveyor bands 87. Once the first and second products are longitudinally aligned in a row by their respective stop members 80, 82, both sets of stop members 80, 82 concurrently release the first and second product stacks for transport to, for example, the first accumulator conveyor 70. Since the accumulator conveyor 70 is driven by a servo motor, its motion may be accurately controlled to align subsequent rows of product longitudinally as needed by the packaging machine 35. Such a longitudinal spacing operation may likewise be performed by the second accumulator conveyor 72.

The aforementioned example describes a simple arrangement for aligning side-by-side stacks and then releasing the stacks in a row. More detailed explanation of formatting product stacks using two rows of stops is described in U.S. Pat. No. 5,810,149, herein incorporated by reference. Once a group of two or more product stacks are longitudinally aligned in one or more rows by their respective stop members 80, 82, the stop members are actuated to concurrently release the products as a formatted row or rows for transport to, for example, the first accumulator conveyor 70. As noted above, one or both of the accumulator conveyors 70 and 72 may be used to longitudinally space successive rows of formatted product.

FIGS. 2–7 illustrate the upper stops 82 located over the row staging conveyor 65. The upper stops 82 each comprise a rectangular baseplate 90 that is supported above the conveyor bands 87 of the conveyor 65. The arrow "A" in FIG. 2 indicates the conveying direction. The baseplate 90 is supported by four posts 94 that are fastened to the baseplate 90 and to side frame members 96, 98 of the conveyor 65. Five pneumatic dual acting cylinders 102 are mounted to the baseplate 90. The cylinders 102 are spaced apart and correspond in lateral position to the desired longitudinal columns of the product stream. The cylinders 102 are also aligned in opposition to each of the lower stops 80.

Each cylinder 102 includes a rod 106 that extends downward through the baseplate 90. The rod is raised or lowered by the cylinder depending on the differential pneumatic pressure exerted on a piston within the cylinder (not shown) that is connected to the rod. An end cap 108, having a diameter greater than the rod 106, is fastened to an end of each rod 106.

A circular disk 112 is operatively connected to each rod 106. A connector 114 is fixed to each disk 112. The connector includes a space 118 having a width slightly greater than a diameter of the end cap 108, and an end hole 120 that is smaller than the diameter of the end cap and larger than the diameter of the rod 106. The connector can include a hole 122 opposite the end hole 120 that has a diameter greater than the end cap 108 to allow for installation of the end cap 108 onto the rod 106. The disk 112 can also have a hole (not shown) aligned with the hole 122 for the installation of the end cap if necessary. The space 118 provides for a vertical lost-motion connection between the disk 112 and the rod 106. The connector 114 can be an inverted U-shaped yoke or a hollow cylinder.

The cylinders 102 are enclosed by a housing 130 that is fastened around its perimeter to the baseplate 90. The housing 130 can include a perimeter groove and a resident o-ring 134 that seals the housing 130 to the baseplate 90. The housing can be composed of plastic.

At one end of the housing 130 are a plurality of quick connect fittings 140 that provide a pneumatic connection manifold for each cylinder 102. Each cylinder 102 includes two inlet/outlet quick connect fittings 142 that are connected by tubes 141 to corresponding ones of the fittings 140. For clarity of description, only two tubes 141 are shown schematically in FIG. 4. The fittings 140 are in turn connected to pneumatic tubes 143 that serve alternately as pressurized air feed or air discharge for the cylinders 102, the charging of the pneumatic tubes or the discharge of the pneumatic tubes is coordinated with the sensing of product stacks by the machine control as described in U.S. Pat. No. 5,810,149, herein incorporated by reference.

In operation, each upper stop 82 is actuated at substantially the same time as a respective lower stop 80. In that regard, pneumatic tubes 143 for each upper stop 82 can be branched from the corresponding pneumatic tube that serves the opposing (through the belts 87) lower stop 80. Alternatively, if more precise synchronizing between the actuation of the upper and lower stops is required, independent pneumatic actuation between upper and lower stops can be coordinated by the machine controller.

According to the invention, when the upper stop 82 is activated to descend onto a product stack, the rod is lowered a preselected amount corresponding to a maximum stack height (as shown in the left side of FIG. 7). However, if the stack height is lower, the lost motion provided by the space 118 allows the disk 112 to fall lower than the position shown in the left side of FIG. 7, with the end cap 108 traveling upward relatively within the space 118. The disk moves downward by gravity, due to the wafer disk 112. However, is also possible, and within the scope of the invention, that a spring can be used in the connector below the end cap 108 to urge the disk 112 downward with respect to the rod 106.

The disk 112 is preferably a 3 inch diameter by ⅜ inch thick disk. The disk 112 and the attached connector 114 weigh about 1 pound. A one pound force is sufficient to hold the stack during stack stopping without unduly compressing the stack.

The right side of FIG. 7 illustrates the disk 112 in its elevated position, before the cylinder 102 is actuated to lower the disk 112. The stroke of the rod 106 by the cylinder between the two positions shown in FIG. 7 is about ¾ inch.

Alternately, the pneumatic cylinders 102 of the stop members 82 may be replaced by linear drive mechanisms that are actuated by electrical control signals. In such instances, the connectors 140 and 142 would be electrical connectors and the supply lines 141, 143 would be electrical conductors.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. In a conveyor wherein stacks of food product are transported on a conveying surface and must be temporarily stopped, a mechanism comprising:
    a control;
    a lower stop in signal-communication with said control, said lower stop having a lower stack-engaging portion and a lift portion, said lift portion selectively actuatable by said control to elevate said lower stack-engaging portion to engage and stop a moving bottom surface of the stack and to lift said stack above said conveying surface; and an upper stop in signal-communication with said control, said upper stop having an upper stack-engaging portion and a lowering portion, said lowering portion selectively actuatable by said control to lower said upper stack-engaging portion to engage and stop a moving upper surface of said stack.

2. The mechanism according to claim 1, comprising a lost-motion connection between said lowering portion of said upper stack-engaging portion to accommodate stacks of varying heights.

3. The mechanism according to claim 2, wherein said upper stack-engaging portion engages said stack by force of the weight of said upper-engaging portion.

4. The mechanism according to claim 2, wherein said lowering portion comprises a pneumatic cylinder having an extending rod, and said lost-motion connection comprises an end cap fixed to said rod and a connection portion fixed to said upper stack-engaging portion, said connection portion having a space allowing limited free vertical movement of said end cap.

5. The mechanism according to claim 1, wherein said lift portion and said lowering portion each comprise a pneumatic cylinder said pneumatic cylinders being dual acting to both lift and lower said upper stack-engaging portion and said lower stack-engaging portion to engage and then release said stack.

6. The mechanism according to claim 1, wherein said upper stack-engaging portion comprises a disk having a flat bottom surface.

7. The mechanism according to claim 1, wherein said lift portion and said lowering portion are configured to act simultaneously.

8. The mechanism according to claim 1, wherein at least one of said upper and lower stack-engaging portions comprises teeth to assist stopping of said stack.

9. A conveyor system for laterally aligning stacks of food products, comprising:
- a conveying surface receiving a stream of stacks sequentially in laterally spaced positions said conveying surface conveying said stacks in longitudinal lanes;
- two lower stops arranged laterally side-by-side beneath two adjacent longitudinal lanes, and each having a lower stack-engaging portion and a lift portion, said lift portion selectively actuatable to elevate said lower stack-engaging portion to engage a bottom surface of the stack and to lift said stack above said conveying surface; and
- two upper stops arranged respectively above said two lower stops, and each having an upper stack-engaging portion and a lowering portion, said lowering portion selectively actuatable to lower said upper stack-engaging portion to engage an upper surface of said stack;
- wherein when two side-by-side stacks are stopped by said two upper stops and said two lower stops, said two upper stops and said two lower stops are activated to transfer said stacks together longitudinally along said conveying surface.

10. The conveyor system according to claim 9, comprising a lost-motion connection between said lowering portion of said upper stack-engaging portion to accommodate stacks of varying heights.

11. The conveyor system according to claim 10, wherein said upper stack-engaging portion engages said stack by force of the weight of said upper-engaging portion.

12. The conveyor system according to claim 10, wherein said lowering portion comprises a pneumatic cylinder having an extending rod, and said lost-motion connection comprises an end cap fixed to said rod and a connection portion fixed to said upper stack-engaging portion, said connection portion having a space allowing limited free vertical movement of said end cap.

13. The conveyor system according to claim 9, wherein said upper stack-engaging portion comprises a disk having a flat bottom surface.

14. The conveyor system according to claim 9, wherein said lift portion and said lowering portion are configured to act simultaneously.

15. The conveyor system according to claim 9, wherein said lift portion and said lowering portion each comprise a pneumatic cylinder, said pneumatic cylinders being dual acting to both lift and lower said upper stack-engaging portion and said lower stack-engaging portion to engage and then release said stack.

16. The system according to claims 9, wherein at least one of said upper and lower stack-engaging portions comprises teeth to assist stopping of said stack.

17. In a conveyor wherein stacks of food product are transported on a conveying surface and must be temporarily stopped, a mechanism comprising:
- a lower stop having a lower stack-engaging portion and a lift portion, said lift portion selectively actuatable to elevate said lower stack-engaging portion to engage and stop a bottom surface of the stack and to lift said stack above said conveying surface;
- an upper stop having an upper stack-engaging portion and a lowering portion, said lowering portion selectively actuatable to lower said upper stack-engaging portion to engage an upper surface of said stack;
- a lost-motion connection between said lowering portion of said upper stack-engaging portion to accommodate stacks of varying heights;
- wherein said upper stack-engaging portion engages said stack by force of the weight of said upper-engaging portion.

18. In a conveyor wherein stacks of food product are transported on a conveying surface and must be temporarily stopped, a mechanism comprising:
- a lower stop having a lower stack-engaging portion and a lift portion, said lift portion selectively actuatable to elevate said lower stack-engaging portion to engage and stop a bottom surface of the stack and to lift said stack above said conveying surface;
- an upper stop having an upper stack-engaging portion and a lowering portion, said lowering portion selectively actuatable to lower said upper stack-engaging portion to engage an upper surface of said stack;
- a lost-motion connection between said lowering portion of said upper stack-engaging portion to accommodate stacks of varying heights;
- wherein said lowering portion comprises a pneumatic cylinder having an extending rod, and said lost-notion connection comprises an end cap fixed to said rod and a connection portion fixed to said upper stack-engaging portion, said connection portion having a space allowing limited free vertical movement of said end cap.

* * * * *